(12) United States Patent
Morgensai

(10) Patent No.: US 7,201,692 B2
(45) Date of Patent: Apr. 10, 2007

(54) COUPLING DEVICE AND IMPROVED CLUTCH LUBRICATION ARRANGEMENT THEREFOR

(75) Inventor: Keith E. Morgensai, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 128 days.

(21) Appl. No.: 10/936,270

(22) Filed: Sep. 8, 2004

(65) Prior Publication Data

US 2006/0052202 A1 Mar. 9, 2006

(51) Int. Cl.
*F16H 57/04* (2006.01)
*F16D 13/72* (2006.01)

(52) U.S. Cl. ............... 475/160; 192/70.12; 192/113.34
(58) Field of Classification Search ................ 475/160
See application file for complete search history.

(56) References Cited

U.S. PATENT DOCUMENTS

| | | | | |
|---|---|---|---|---|
| 3,326,064 | A | * | 6/1967 | Ordorica, Jr. .............. 192/70.2 |
| 3,448,635 | A | * | 6/1969 | Nelson ........................ 475/160 |
| 3,495,298 | A | * | 2/1970 | Engle et al. ................. 475/160 |
| 3,533,488 | A | * | 10/1970 | Jeakle et al. ................. 475/160 |
| 5,310,388 | A | | 5/1994 | Okcuoglu et al. ............ 475/88 |
| 6,464,056 | B1 | | 10/2002 | Lowell et al. ................. 192/35 |
| 6,585,095 | B2 | * | 7/2003 | Savoyard et al. ......... 192/70.12 |
| 6,743,136 | B1 | * | 6/2004 | Jensen ........................ 475/160 |

FOREIGN PATENT DOCUMENTS

| | | | |
|---|---|---|---|
| JP | 57-134045 A | * | 8/1982 |
| JP | 57-137766 A | * | 8/1982 |

* cited by examiner

*Primary Examiner*—Rodney H. Bonck
(74) *Attorney, Agent, or Firm*—Bradley J. Diedrich; L. J. Kasper

(57) ABSTRACT

A coupling device (11) including a housing (13, 15) defining a clutch cavity (39) and at least one window (55, 57) extending through the housing adjacent the clutch cavity. A clutch assembly (29) is disposed within the clutch cavity and includes a first clutch disc (31) having ears (63) to limit rotation relative to the housing. The housing defines a plurality of fluid passages (67) extending axially from the window to the clutch cavity, the housing defining a plurality of axial recesses (61), each of which receives one of the ears of each disc. Each of the fluid passages (67) is in fluid communication with one of the axial recesses (61), and receives fluid as the window passes through a reservoir of fluid (F).

6 Claims, 4 Drawing Sheets

COUPLING DEVICE AND IMPROVED CLUTCH LUBRICATION ARRANGEMENT THEREFOR

BACKGROUND OF THE DISCLOSURE

The present invention relates to coupling devices of the type used to transmit torque, for example, in a vehicle drive line, and more particularly, to an improved clutch assembly for use in such a coupling device, and an improved arrangement for providing lubrication to the clutch assembly.

As used herein, the term "coupling device" will be understood to mean and include a device which is able to transmit torque from an input to one or more outputs, and in which there is a clutch assembly disposed between the input and the output, such that the amount of torque transmitted is a function of the extent of engagement of the clutch assembly. Within the scope of the present invention, the term "coupling device" means and includes both gear-type devices (such as differentials), as well as gearless-type couplings, although it will be understood by those skilled in the art from reading and understanding the present specification, that the invention will probably find its greatest application in gear-type coupling devices, i.e., those including conventional differential gearing.

Although the coupling device and the improved clutch assembly for use therein, in accordance with the present invention, may be utilized with many different types and configurations of coupling devices, it is especially advantageous when utilized in conjunction with vehicle differentials of the type illustrated and described in U.S. Pat. Nos. 5,310,388 and 6,464,056, both of which are assigned to the assignee of the present invention and incorporated herein by reference. Both of the above-incorporated patents show differential coupling devices of the gear-type.

In the differential coupling devices of the cited patents, there is a clutch pack operable to transmit torque between the input (housing connected to the ring gear) and the output (one of the axle shafts), with the degree of engagement of the clutch pack being determined by the fluid pressure in a piston chamber. The fluid pressure biases a clutch piston against the clutch pack. The differential coupling devices of the cited patents include a gerotor pump having one rotor fixed to rotate with the input and the other rotor fixed to rotate with the output, such that the flow of pressurized fluid into the clutch piston chamber is generally proportional to the speed difference between the input and the output. As used herein, the term "clutch pack" will be understood to mean and include both a multiple friction disc type clutch pack, as well as any of the other well known types of clutch assemblies, such as cone clutches, in which the degree of engagement is generally proportional to the fluid pressure acting on the clutch piston, or on an equivalent clutch-engagement structure.

It should be understood that the present invention is not limited to any particular type of "clutch apply" arrangement, i.e., the clutch pack can, within the scope of the invention, be loaded or biased by some means other than a fluid pressure biased piston. In addition, the present invention is not specifically limited to a coupling device in which the source of pressurized fluid (if a pressure biased piston is used) is an "on-board" pump. The invention may also be used advantageously in coupling devices in which the source of pressurized fluid is some sort of pump external to the differential coupling device.

The present invention does find its primary application in differential coupling devices of the type in which the clutch assembly (clutch pack) comprises a multiple friction disk type clutch pack, in which every other disk within the clutch pack is rotatably fixed, relative to the housing of the coupling device, by some sort of "ear" arrangement. In such an arrangement, of the type which is now generally well known to those skilled in the art, the "eared disks" each have a plurality of half-circular ears (tabs) disposed about the outer periphery of the disk, while the adjacent clutch housing includes a corresponding number of ear-receiving devices, received within recesses or cut-out portions defined by the clutch housing.

More specifically, the ear-receiving devices have typically comprised members known as "ear guides" which have conventionally been stamped from cold rolled steel and then subsequently hardened, to be able to withstand the substantial torques transmitted from the housing, through the ear guides, to the eared disks, and eventually to the axle shaft. Although, in many differential devices, the use of such ear guides has been generally satisfactory, those skilled in the art have recognized that there is a substantial disadvantage in the need to use the separate ear guides, in terms of manufacturing costs and space within the coupling device.

It has also been observed that in differential coupling devices of the type shown in the above-incorporated patents, appropriate lubrication of the individual friction disks of the clutch pack can be quite difficult. It may be noted from a review of the above-incorporated patents that, in those devices, the clutch pack tends to be totally surrounded by housing and other associated structure, and very much isolated from a source of lubrication, which would typically be the fluid contained in a reservoir defined by the outer differential housing.

BRIEF SUMMARY OF THE INVENTION

Accordingly, it is an object of the present invention to provide an improved arrangement for receiving the ears of the eared disks.

It is another object of the present invention to provide an improved differential coupling device including an improved arrangement for communicating lubrication fluid to the individual clutch members of the clutch assembly.

It is a more specific object of the present invention to provide an improved differential coupling device which achieves the above-stated objects, and utilizes some common structure for achieving both of the above objects at the same time.

The above and other objects of the invention are accomplished by the provision of an improved coupling device for eventual installation within an outer housing containing a reservoir of fluid, the coupling device including a housing and being adapted to drive at least one axle shaft defining an axis of rotation, the housing defining a central axis disposed perpendicular to the axis of rotation and further defining a gear chamber surrounding the central axis, and further defining a clutch cavity. Differential gearing is disposed in the gear chamber including at least one input gear and at least one output gear adapted to drive the axle shaft, the housing defining at least one window extending from the exterior of the housing through to the interior of the housing in the region of the gear chamber. A clutch assembly is disposed in the clutch cavity, and a clutch apply member is operably associated with the clutch assembly, the clutch assembly including a first clutch member fixed to rotate with the housing and a second clutch member fixed to rotate with the output gear. The first clutch member includes a plurality N of ears operably associated with the housing to limit rotation of the first clutch member relative thereto.

The improved coupling device is characterized by the housing defining a plurality M of fluid passages extending generally axially from the window defined by the housing to the clutch cavity. The housing, in the region bounding the clutch cavity, defines a plurality N of axially-extending recesses, each of which receives therein one of the plurality N of the ears. Each of the plurality M of fluid passages is in open fluid communication with one of the plurality N of the axially extending recesses.

DETAILED DESCRIPTION OF THE PREFERRED EMBODIMENT

Figure 1:
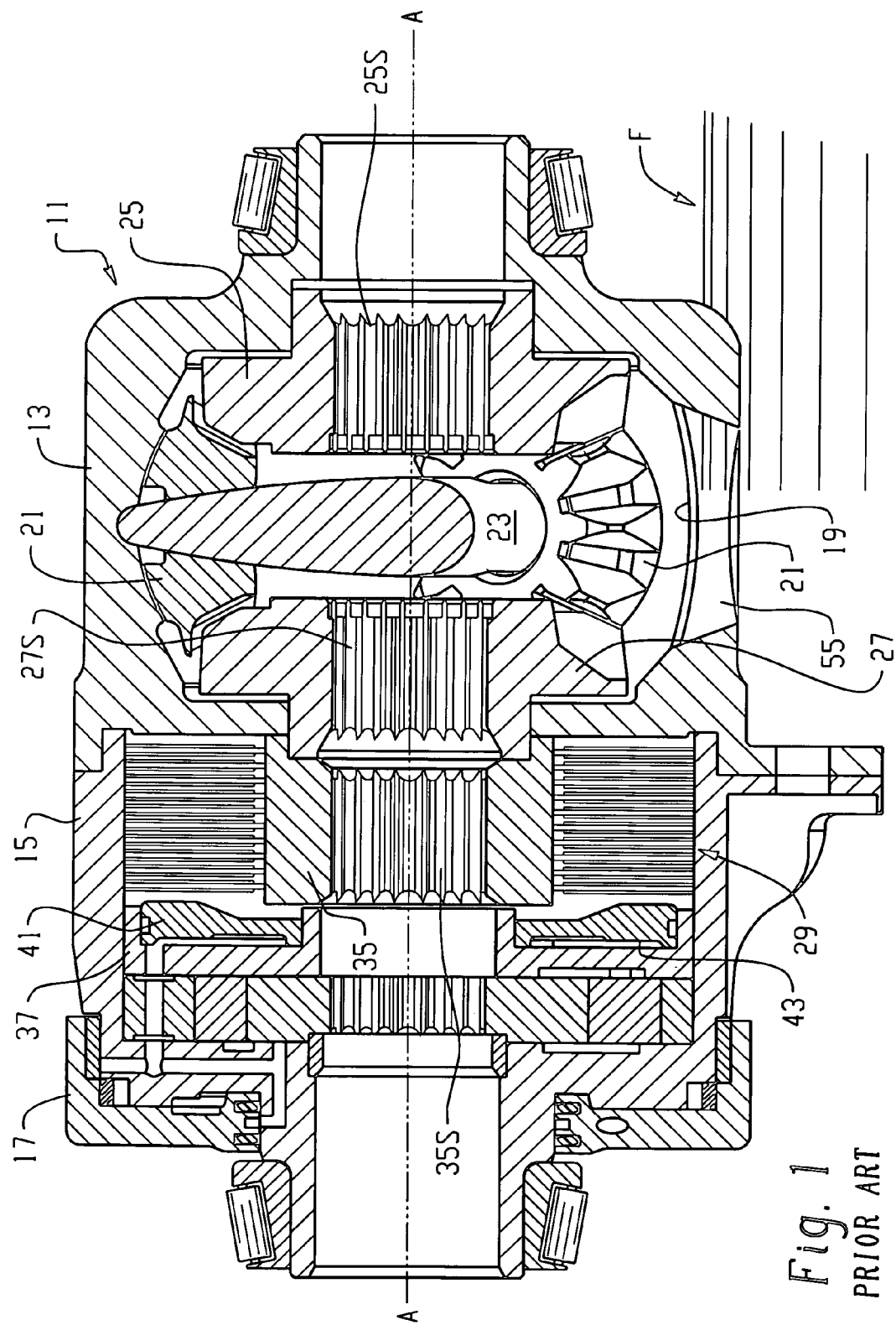
FIG. 1 is an axial cross-section of a vehicle differential coupling device of the general type with which the present invention may be utilized.

Referring now to the drawings, which are not intended to limit the invention, FIG. 1 illustrates a differential coupling, generally designated 11, for use in a vehicle drive line, and which is of the general type illustrated and described in the above-incorporated patents (and which therefore is labeled "PRIOR ART"), and which is especially well suited for use in connection with the improved lubrication arrangement, and the improved disc ear-receiving arrangement of the present invention. The differential coupling 11 comprises a housing, including a gear housing 13, and in the PRIOR ART device of FIG. 1, a separate clutch housing 15. The housing also includes a valve housing 17, with all of the housings 13, 15 and 17 being held together by any suitable means, well known in the art.

Referring still to FIG. 1, the gear housing 13 defines a gear chamber 19, and disposed therein, but by way of example only, there may be provided a typical differential gear set. In the subject embodiment, there is included a pair of input pinion gears 21, rotatably mounted relative to a pinion shaft 23, the pinion gears 21 being in toothed engagement with a pair of side gears 25 and 27. In the subject embodiment, and again by way of example only, the input pinion gears 21 (along with the housings 13 and 15) may be considered the "input" to the coupling 11, while the side gears 25 and 27 comprise the "outputs" of the coupling device 11. More specifically, for purposes of most of the subsequent description, the side gear 27 will be considered to comprise the "output" of the coupling 11. The pinion gears 21 and the pinion shaft define a central axis "C" which will be understood to mean not the overall center of the coupling 11, but instead, the center of the gear chamber 19.

The side gears 25 and 27 define sets of straight, internal splines 25S and 27S, respectively, which are adapted to receive right and left axle shafts (not shown herein), whereby the coupling device 11 transmits torque, by means of the axle shafts, to associated vehicle drive wheels (also not shown). It should be clearly understood, however, that the structure described hereinabove is by way of example only, and the disc ear-receiving and lubrication arrangements of the present invention may also be used with various other types of structures. In fact, the arrangements of the present invention may be used generically in any sort of differential coupling device having a clutch assembly in which there is a clutch member which must be retained to be non-rotatable relative to the clutch housing, using some sort of "ear" or other similar portion extending radially from the outer periphery of the clutch member, with the ear being received by, or relative to, the surrounding housing.

Referring still primarily to FIG. 1, there is disposed within the clutch housing 15 a clutch pack, generally designated 29 which, as is shown in greater detail in FIG. 2, comprises a plurality of outer discs 31 which are in engagement with the clutch housing 15, by an arrangement which comprises one important aspect of the present invention, and which will be described in greater detail subsequently. Whereas in FIG. 1 there are two separate housing members 13 and 15, in the subject embodiment of the invention, as shown in FIGS. 2 through 5, there is a gear housing portion 13 and a clutch housing portion 15, but the portions 13 and 15 are actually shown herein (especially in FIGS. 3 and 4) as comprising a single housing member, although the present invention is not limited to either a single housing member, or to multiple housing members.

In addition to the outer discs 31, the clutch pack 29 includes a plurality of inner discs 33, which are interleaved with the outer discs 31 in a well known manner, the inner discs 33 being in splined engagement with a coupling member 35, although the manner of connection of the inner discs 33 to the coupling member 35 is outside the scope of the present invention, and may be by any suitable means. The coupling member 35 defines a set of internal splines 35S, which are also, in the subject embodiment, in splined engagement with the left axle shaft, such that the coupling member 35 is fixed, in the subject embodiment, to rotate with the side gear 27. The left axle shaft, the side gear 27, and the coupling member 35 cooperate to define an axis of rotation "A", shown in both FIGS. 1 and 2.

Also disposed within the clutch housing portion 15 is an annular housing insert 37 which cooperates with the adjacent coupling member 35, and with the clutch pack 29, to define a clutch cavity 39. Disposed within the clutch cavity 39, and moveable axially therein, is a clutch piston 41 which cooperates with the housing insert 37 to define a piston pressure chamber 43, which may better be seen in FIG. 2. As is now well known to those skilled in the art of such devices, variations in the fluid pressure in the piston pressure chamber 43 will result in variations in the axial force applied by the clutch piston 41 to the clutch pack 29 and therefore, will result in variations in the "bias torque", i.e., the torque transmitted through the clutch pack from the input of the coupling 11 to the output. The present invention is especially advantageous in coupling devices of the type in which the bias torque can be modulated, which typically involves varying the loading on the clutch pack 29, so that there is a substantial amount of slipping engagement between the outer discs 31 and the inner discs 33.

Figure 2:
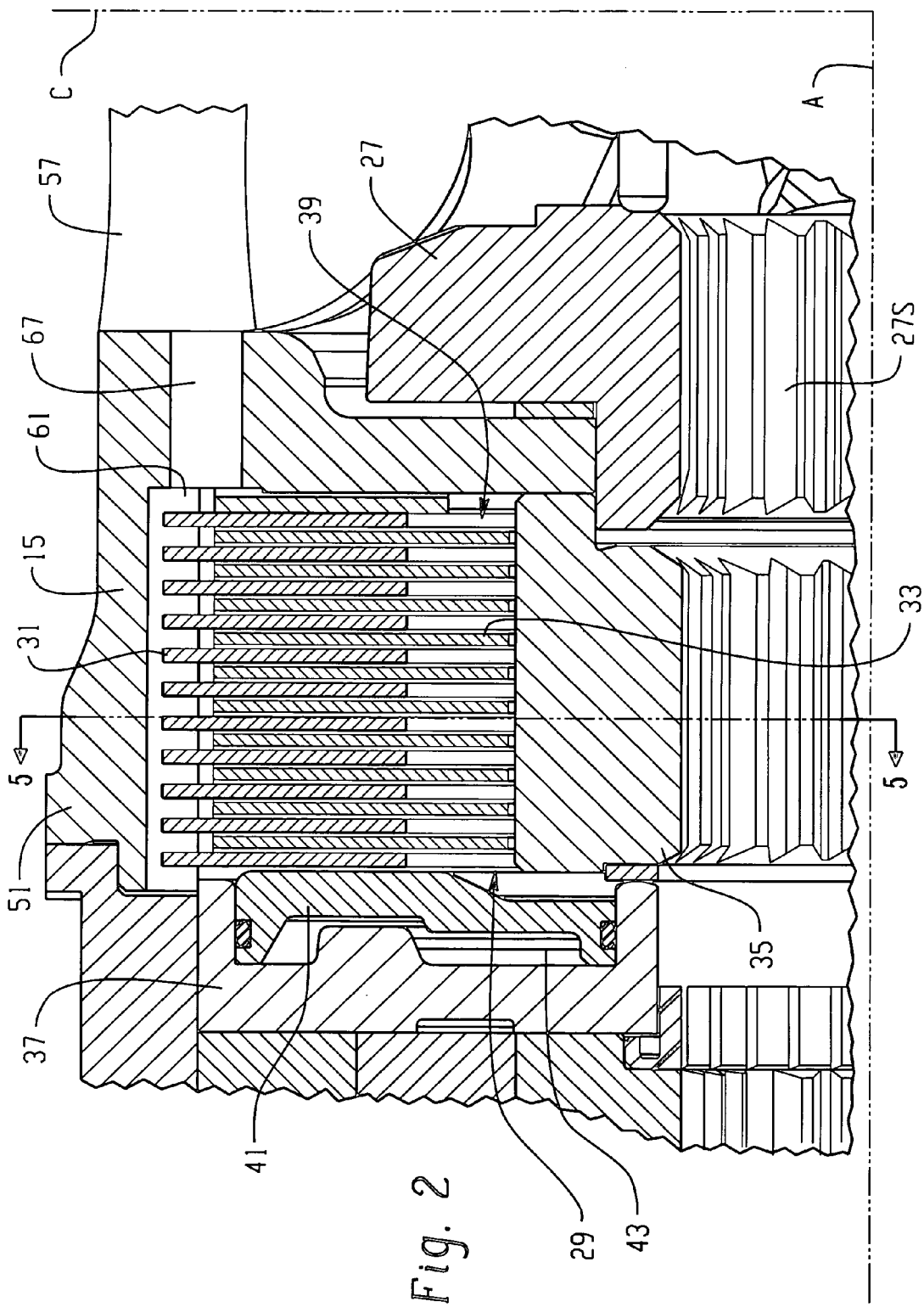
FIG. 2 is a greatly enlarged, fragmentary, axial cross-section, similar to FIG. 1, but illustrating one aspect of the present invention.
Figure 3:
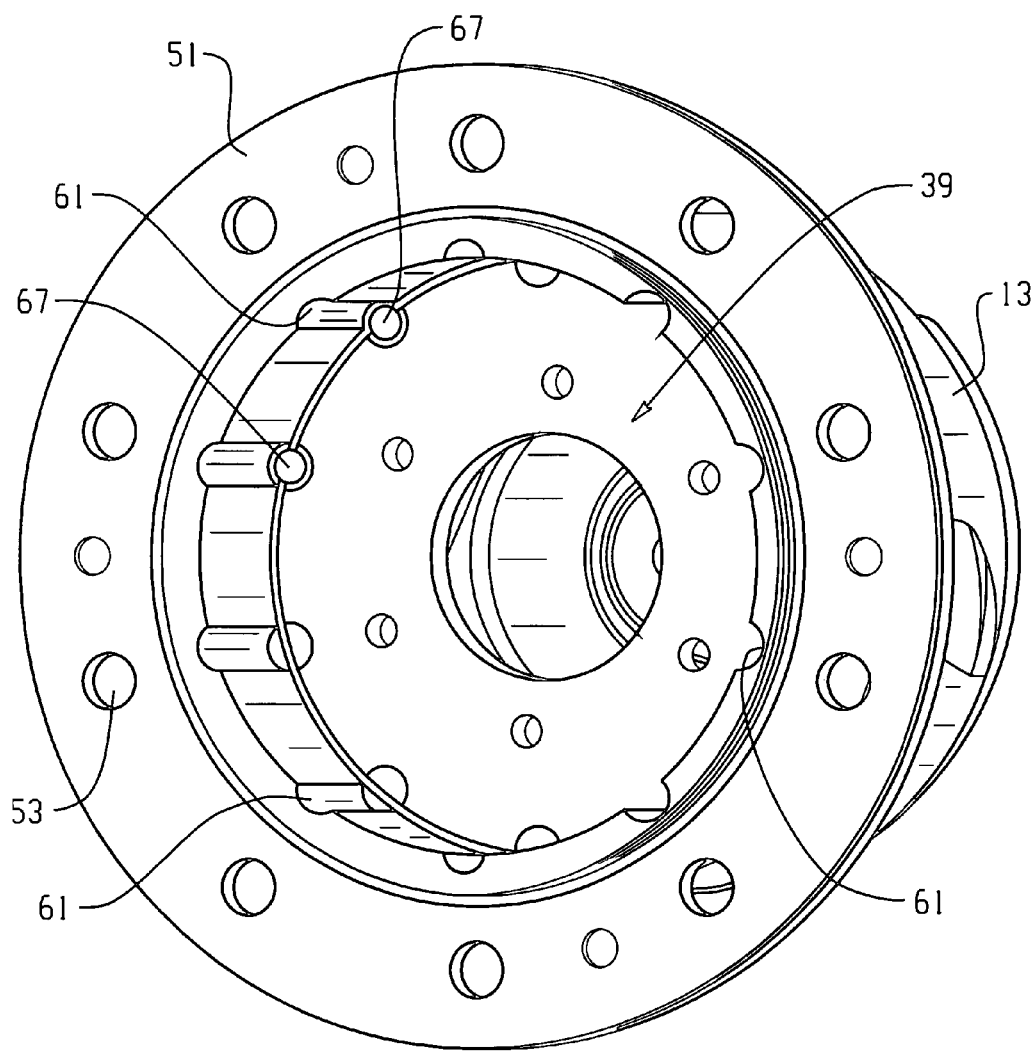
FIG. 3 is a perspective view of the housing, made in accordance with the present invention, with the clutch assembly omitted for ease of illustration.
Figure 4:
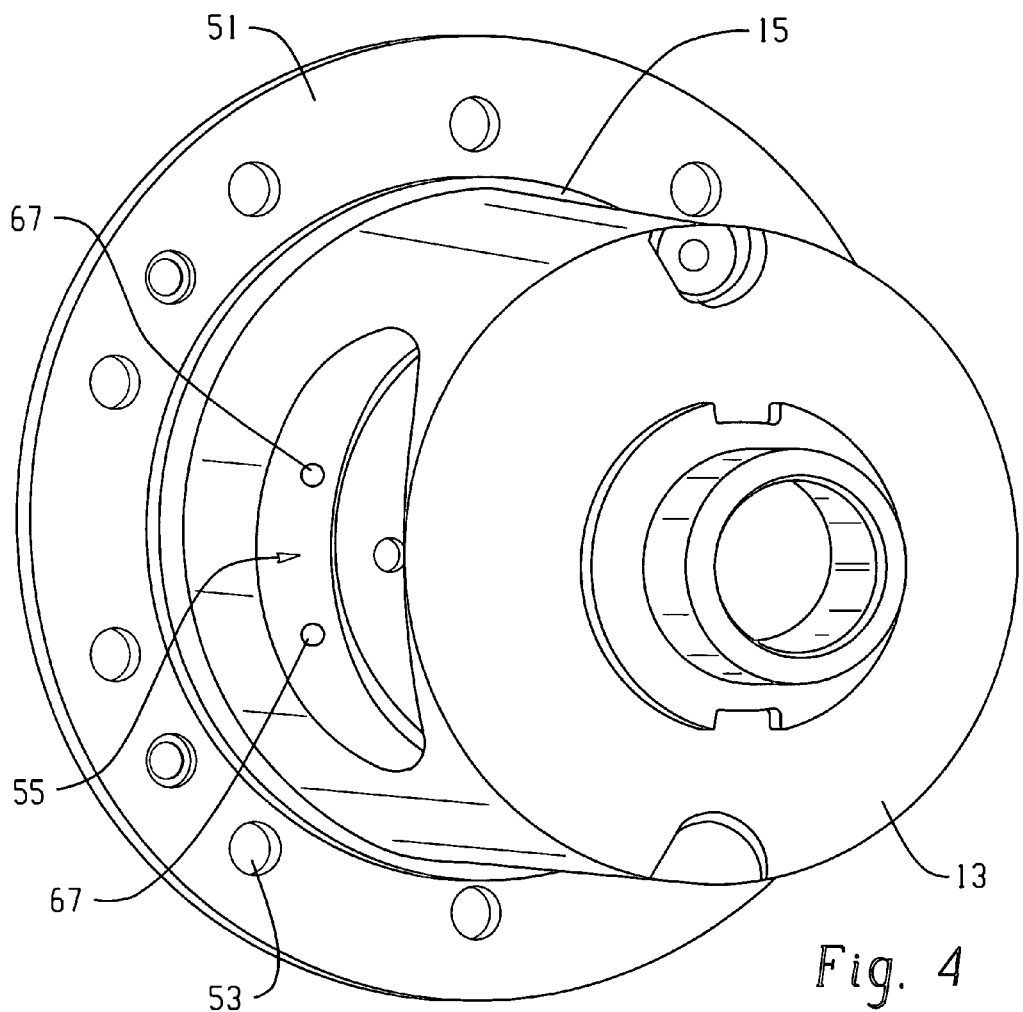
FIG. 4 is a perspective view of the housing shown in FIG. 3, but viewed from the opposite direction, illustrating another aspect of the present invention.

Referring now primarily to FIGS. 3 and 4, it may be seen that the housing, in the subject embodiment, has a flange portion 51, extending radially from the clutch housing portion 15 toward the left end of the clutch housing portion 15 (flange portion 51 being shown only fragmentarily in FIG. 2). The flange portion 51 defines a plurality of bolt holes 53, which would typically be used to bolt an input ring gear (not shown herein) to the flange portion 51, such that input drive torque may be transmitted through the ring gear to the coupling device 11.

Referring again briefly to FIG. 1, there is a somewhat schematic representation of the fluid F which would typically be disposed within an outer differential housing (not shown herein). The gear housing portion 13, as shown in FIG. 1, includes a window 55, as is generally well known to those skilled in the art. Typically, the window 55 is required in a gear type differential coupling device to facilitate insertion of the input pinion gears 21 and the side gears 25 and 27 within the gear housing portion 13, prior to the assembly thereof. The fluid F is shown schematically in FIG. 1 primarily to illustrate that, in accordance with one aspect of the present invention, the level of the fluid F within the outer differential housing is preferably such that, when the coupling 11 rotates, the window 55 passes through the fluid F, for reasons which will be explained subsequently. The window 55 may also be seen in the perspective view of FIG. 4. Preferably, and as is best seen in FIG. 2, the gear housing portion 13 also includes a second window 57, and typically, the first window 55 and the second window 57 are disposed diametrically opposite each other. The windows 55 and 57 would typically, but not necessarily, be centered about, or axially symmetrical about, the central axis C.

Figure 5:
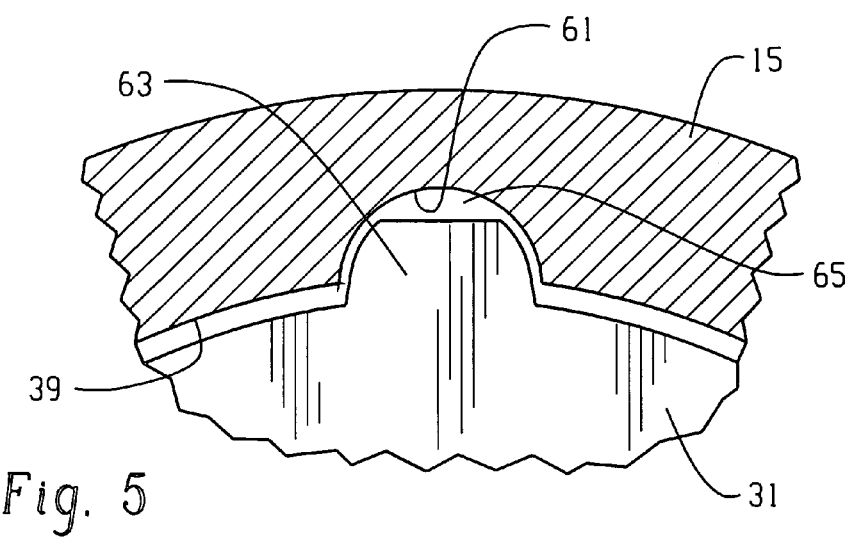
FIG. 5 is a further enlarged, fragmentary, transverse cross-section, taken on line 5—5 of FIG. 2 and illustrating a still further aspect of the present invention.

Referring now primarily to FIGS. 2, 3 and 5, and in accordance with one important aspect of the invention, the clutch housing portion 15 defines a plurality N of recesses 61, each of which, as is best seen in FIG. 5, is generally half-circular in cross-sectional area, by way of example only. In the subject embodiment, and also by way of example only, the recesses 61 are milled into the clutch housing portion 15. Received within each of the recesses 61 is a disc ear 63, preferably formed integrally with the respective outer disc 31, such that each recess 61 has disposed therein a number of disc ears 63 equal to the number of outer discs 31 within the clutch pack 29, in the subject embodiment, that number being eleven disc ears 63. In FIG. 5, and for ease of illustration, the disc ear 63 is shown spaced apart from the adjacent surface of the recess 61, but those skilled in the art will understand that there would normally be a somewhat closer fit than what is shown in FIG. 5. Also, and in accordance with one aspect of the invention, each disc ear 63 is configured to be somewhat smaller than the cross-section of the recess 61, i.e., to leave a fluid passage 65 between the disc ear 63 and the recess 61, for reasons to be explained in greater detail subsequently.

Referring now primarily to FIGS. 2 and 4, in accordance with a further aspect of the present invention, the gear housing portion 15 defines a plurality M of fluid passages 67, each of which extends axially from one of the windows (55 or 57) to communicate with a respective one of the recesses 61 (and therefore, with a respective one of the fluid passages 65). In the subject embodiment, and by way of example only, there are ten disc ears 63 on each outer disc 31, and therefore, there are ten of the recesses 61 (N=10), and these ten recesses are spaced uniformly, circumferentially so that the disc ears 63 are also spaced uniformly. As is best seen in FIG. 4, there are two of the fluid passages 67 extending from each window, and therefore, in the subject embodiment, with two windows 55 and 57, there are a total of four of the fluid passages 67 (M=4), such that six of the recesses 61 are not in communication with a fluid passage 67, but instead, are merely "ear-receiving means". Preferably, after the ten recesses 61 are milled, the four fluid passages 67 are drilled, drilling in the same direction as the view of FIG. 3, so that the drill breaks out into the respective window 55 or 57.

Referring again also to FIG. 1, as the coupling 11 is stationary within the outer housing, or as it rotates slowly within the outer housing, the windows 55 and 57 and the fluid passages 67 pass through the fluid F which serves as a fluid reservoir within the housing. Each time a fluid passage 67 passes through the fluid F, or spends a period of time within the fluid F, a certain amount of the fluid is able to enter the fluid passage 67 and flow axially (to the left in FIG. 2) until the fluid enters the respective recess 61. Thereafter, the fluid flows through the respective recess 61, adjacent fluid passage 65, with a certain amount of the fluid engaging each successive disc ear 63. As fluid engages each disc ear 63, the fluid flows radially inwardly, between that particular outer disc 31 and the "preceding" inner disc 33, i.e., the preceding disc as the fluid flows away from the gear housing portion 13. Thus, the fluid flowing through each fluid passage 65 substantially improves the lubrication and cooling of the various discs of the clutch pack 29, because of the arrangement, in accordance with the present invention, of the fluid passages 67, then the fluid passages 65, and the flow of fluid past the ear discs 63, and the resulting flow of fluid between adjacent discs 31 and 33.

As is best shown in FIGS. 2 and 5, and in accordance with an important aspect of the invention, there are none of the conventional, prior art ear guides included between each of the disc ears 63 of the outer discs 31 and the clutch housing portion 15. As may also be seen in those figures, there would not be available the amount of space (especially, radially) which would typically be required for the presence of the conventional, stamped ear guide. Furthermore, as is best seen in FIG. 5, the presence of a separate ear guide between the disc ear 63 and the recess 61 would substantially eliminate (i.e., would block) the fluid passage 65 which is such an important aspect of the invention, to help provide sufficient lubrication and cooling between each adjacent pair of discs 31 and 33. The absence of the separate, prior art ear guides also substantially simplifies the assembly process of placing the clutch assembly 29 into the clutch housing portion 15.

During the course of the development of a commercial embodiment of the present invention, it was determined by visual observation, using a dye added to the lubrication fluid, that the improved disc ear receiving arrangement, and lubrication arrangement of the invention, substantially improved the ability to get lubrication between adjacent clutch discs. Those skilled in the art will understand and appreciate the difficulty of providing sufficient lubrication in a clutch assembly, which is subjected to slipping engagement, especially a clutch assembly, such as is shown herein in FIGS. 1 and 2, wherein the clutch assembly is so enclosed by the clutch housing portion 15. Those skilled in the art will understand that any relative rotation which occurs between each outer disc 31 and the adjacent inner disc 33 will serve to distribute the lubrication fluid between the adjacent disc surfaces.

Although the present invention has been illustrated and described in connection with an embodiment which, as shown in FIGS. 2 through 4, utilizes only four of the fluid passages 67 to feed four of the ten recesses 61, and such has proven to provide sufficient benefit in terms of lubrication and cooling, the invention is not so limited. For example, and as a possible alternative embodiment, one or two additional fluid passages 67 could be added to each window 55 or 57, if the added fluid passages 67 were not axial, as shown in FIGS. 2 and 4, but instead, extended from the respective window (55 or 57) at an angle to communicate with the next adjacent recess 61. As a further alternative, and if the loading on the clutch assembly were expected to be especially heavy, each recess 61 could be fed by a fluid passage (such as fluid passage 67), but wherein the fluid passage would start next to the respective window, and opening from the outer cylindrical surface of the clutch housing portion 15, then would extend radially inward, and axially to the left in FIG. 2, toward the recess 61, to be in open communication with the respective recess 61 at the same location as does the fluid passage 67. In such an arrangement, there could be, if needed for sufficient lubrication, such a fluid passage associated with each of the ten recesses 61. Furthermore, a number of these fluid passages could also be oriented somewhat circumferentially in the normal direction of rotation of the coupling 11, such that the fluid passage would effectively "scoop" the fluid and thereby create a pressure head to force lubrication fluid through the fluid passage and through the recess 61.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A coupling device for eventual installation within an axle housing containing a reservoir of fluid, said coupling device including a housing and being adapted to drive at least one axle shaft defining an axis of rotation, said housing defining a central axis, disposed perpendicular to said axis of rotation, and further defining a gear chamber surrounding said central axis, and further defining a clutch cavity; differential gearing disposed in said gear chamber including at least one input gear and at least one output gear adapted to drive the axle shaft, said housing defining at least one window extending from the exterior of said housing through to the interior of said housing in the region of said gear chamber; a clutch assembly disposed in said clutch cavity, and a clutch apply member operably associated with said clutch assembly, said clutch assembly including a first clutch member fixed to rotate with said housing and second clutch member fixed to rotate with said output gear; said first clutch member including a plurality N of ears operably associated with said housing to limit rotation of said first clutch member relative thereto; characterized by:
    (a) said housing defining a plurality M of fluid passages extending generally axially from said window defined by said housing to said clutch cavity;
    (b) said housing, in the region bounding said clutch cavity, defining a plurality N of axially-extending recesses, each of which receives therein one of said plurality N of said ears; and
    (c) each of said plurality M of said fluid passages being in open fluid communication with one of said plurality N of said axially extending recesses.

2. A coupling device as claimed in claim 1, characterized by said reservoir of fluid contained within said axle housing being disposed, relative to said coupling device, such that, as said coupling device rotates within and relative to said axle housing, said window passes through said fluid.

3. A coupling device as claimed in claim 2, characterized by said window comprising two separate windows, diametrically opposite each other, said housing defining a plurality M/2 of said fluid passages extending axially from each of said windows to said clutch cavity.

4. A coupling device as claimed in claim 1, characterized by said differential gearing comprising a pinion shaft disposed to be co-axial with said central axis, and a pair of input pinion gears rotatably disposed about said pinion shaft and in toothed engagement with said output gear.

5. A coupling device as claimed in claim 1, characterized by said clutch assembly including a plurality X of said first clutch members, each including a plurality N of said ears disposed within said plurality N of said axially-extending recesses, said clutch assembly further comprising a plurality of said second clutch members interleaved with said plurality of said first clutch members.

6. A coupling device as claimed in claim 5, characterized by substantially the only source of lubrication fluid for said clutch assembly comprises fluid disposed within said window, as said coupling device rotates through said fluid, said fluid in said window flowing through said plurality M of fluid passages, and then through the respective ones of said plurality of said axially extending recesses, engaging each of said plurality X of said ears disposed within each axially-extending recess.

* * * * *